United States Patent [19]

Samson et al.

[11] Patent Number: 5,590,402
[45] Date of Patent: Dec. 31, 1996

[54] MULTI-MODE TRANSMITTER FOR TRANSMITTER FOR SIGNALS HAVING VARYING DEVIATION LEVELS

[75] Inventors: Randall J. Samson, Ft. Worth; Allan Budlong; Dan Huslig, both of Bedford, all of Tex.

[73] Assignee: Motorola, Inc., Schaumburg, Ill.

[21] Appl. No.: 421,148

[22] Filed: Apr. 13, 1995

Related U.S. Application Data

[63] Continuation of Ser. No. 896,707, Jun. 10, 1992, abandoned.

[51] Int. Cl.$^6$ ............................. H04B 7/005; H04B 7/26
[52] U.S. Cl. .................. 455/44; 455/33.1; 455/93
[58] Field of Search ........................... 455/72, 95, 116, 455/126, 127, 33.1, 89, 186.1, 44, 115, 110, 113, 119, 109, 93, 42, 76, 111; 379/58, 60; 332/119, 183; 375/295, 302, 219

[56] References Cited

U.S. PATENT DOCUMENTS

| 3,195,047 | 7/1965 | Ruthroff | 455/44 |
|---|---|---|---|
| 3,327,216 | 6/1967 | Sichak | 455/44 |
| 3,706,946 | 12/1972 | Bickford et al. | 332/183 |
| 4,581,749 | 4/1986 | Carney et al. | 455/44 |
| 4,581,766 | 4/1986 | Parker | 455/109 |
| 4,682,123 | 7/1987 | Loper et al. | 332/119 |
| 4,905,305 | 2/1990 | Garner et al. | 455/186.1 |
| 4,972,455 | 11/1990 | Phillips et al. | 455/76 |
| 5,022,046 | 6/1991 | Morrow, Jr. | 370/18 |
| 5,107,225 | 4/1992 | Wheatley, III et al. | 455/239.1 |
| 5,179,360 | 1/1993 | Suzuki | 455/93 |
| 5,396,653 | 3/1995 | Kinari et al. | 455/33.1 |
| 5,414,385 | 5/1995 | Worsham, Jr. | 455/214 |

OTHER PUBLICATIONS

K. Sam Shanmugam, "Digital and Analog Communication System", 1979, pp. 283–289.
*Syntor X High–Band Radio*, Motorola Mobile Products Division, Manual No. 68P81060E05–B, Motorola Technical Publication Services, 5555 North Beach Street, Ft. Worth, TX. 76137, printed in the USA.

*Primary Examiner*—Chi H. Pham
*Assistant Examiner*—Nguyen Vo
*Attorney, Agent, or Firm*—Richard A. Sonnentag

[57] ABSTRACT

A dual-mode transmitter (100) adjusts a signal's deviation level when switched between a wideband mode and a narrowband mode of operation. The transmitter (100) automatically attenuates the deviation of the signal based on a ratio of the maximum deviation level for the wideband mode to the maximum deviation for the narrowband mode utilizing wideband/narrowband maximum deviation adjust circuitry (115). Because the attenuation based on the ratio of the maximum deviation levels is too large for a narrowband mode signal having average deviation, the signal is amplified based on a ratio of the average deviation level for the wideband mode to the average deviation for the narrowband mode utilizing wideband/narrowband average deviation adjust circuitry (103). Attenuation and amplification of the signal's deviation occur when the dual-mode transmitter (100) is operating in the narrowband mode.

5 Claims, 1 Drawing Sheet

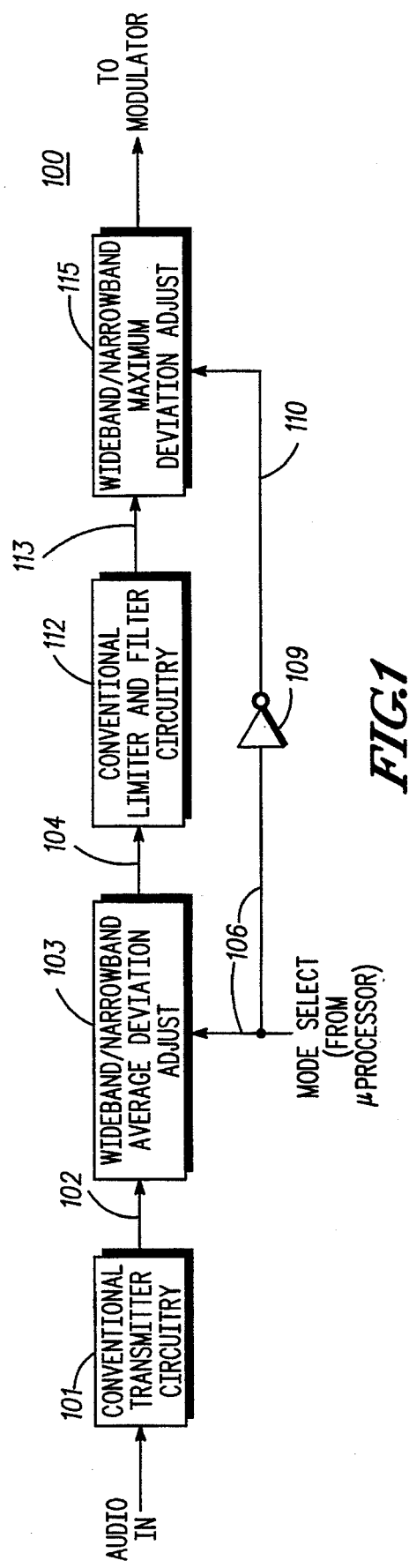
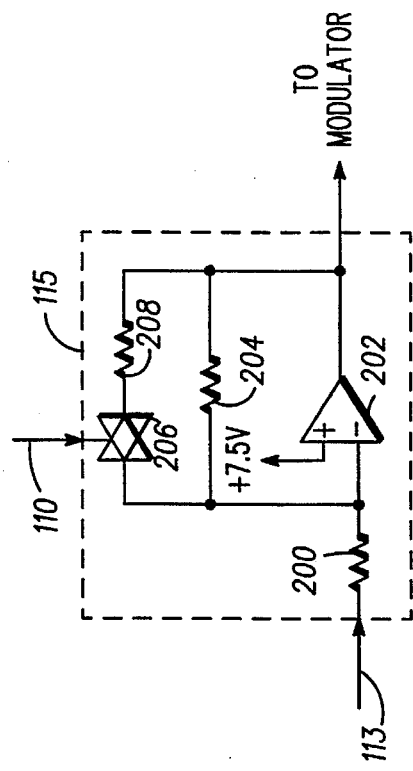
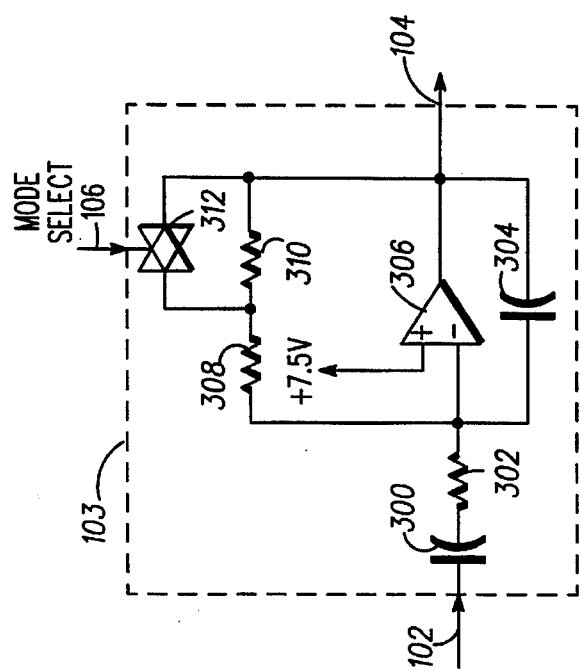

5,590,402

MULTI-MODE TRANSMITTER FOR TRANSMITTER FOR SIGNALS HAVING VARYING DEVIATION LEVELS

This is a continuation of application Ser. No. 07/896,707, filed Jun. 10, 1992 and now abandoned.

FIELD OF THE INVENTION

The invention relates generally to transmitters in communication systems, and more specifically to dual-mode transmitters which transmit signals of varying deviation levels in communication systems.

BACKGROUND OF THE INVENTION

In a typical communication system, for example, an analog cellular radiotelephone system, adjustment of the voice deviation level of a signal transmitted is not required. The average and maximum deviation levels of a signal that a typical transmitter may be expected to transmit is essentially known for a given system, and as such circuit component values (i.e., resistors, capacitors, etc.) that comprise the transmitter can be designed into the transmitter circuitry. Consequently, the transmittal need not be capable of automatic deviation adjustment.

However, as techniques are developed to increase subscriber capacity without increasing the amount of cellular radiotelephone hardware required, new techniques for voice modulation, and hence entire systems, also develop. For example, one such system is the Narrowband Advanced Mobile Phone System (NAMPS). In NAMPS, enhanced compression techniques are utilized to essentially compress the voice conversations of three subscribers into the bandwidth of a typical analog transmission (AMPS, for example). As such, the deviation level that each subscriber conversation undergoes is decreased in the narrowband mode (NAMPS) in relation to the typical deviation level the conversation would normally undergo in the wideband mode (AMPS).

It is both economical and efficient to use a single, dual-mode transmitter for both the narrowband mode and the wideband mode. However, to manually adjust the dual-mode transmitter between the narrowband mode and the wideband mode via potentiometers is very inconvenient. Since voice deviation level accuracy is critical for quality mobile phone usage, and access to dual-mode transmitters is limited once they are employed in a cellular radiotelephone system, manual adjustments between the wideband and narrowband modes is impractical.

Thus, a need exists for a dual-mode transmitter which automatically adjusts between wideband and narrowband modes of operation while compensating for various extremes of voice deviation levels to be transmitted.

SUMMARY OF THE INVENTION

A transmitter transmits signals having varying deviation levels. The transmitter has the capability to operate in at least two modes, a first mode corresponding to a first deviation level and a second modes corresponding to a second deviation level. The transmitter comprises means for determining which of the first or second mode in which the transmitter is to transmit and means, coupled to the means for determining, for adjusting the deviation level of the transmitted signal based on the determined mode.

BRIEF DESCRIPTION OF THE DRAWINGS

FIG. 1 generally depicts, in block diagram form, a dual-mode transmitter in accordance with the invention.

FIG. 2 generally depicts, in circuit diagram form, wideband/narrowband maximum deviation adjust circuitry implemented in accordance with the invention.

FIG. 3 generally depicts, in circuit diagram form, wideband/narrowband average deviation adjust circuitry implemented in accordance with the invention.

DETAILED DESCRIPTION OF A PREFERRED EMBODIMENT

FIG. 1 generally depicts a dual-mode transmitter 100 in accordance with the invention. In general, transmitter 100 provides attenuation of the deviation levels when changing from a first, or wideband, mode to a second, or narrowband, mode. As will be discussed, the attenuation is not accurate for all varying levels of deviation, thus, amplification is also employed during the change from the wideband mode to the narrowband mode.

As depicted in FIG. 1, transmitter 100 is comprised of conventional transmitter circuitry 101, which may be of the type described in Motorola Instruction Manual No. 68P81058E32-A published by Motorola Service Publications, Schaumburg, Ill., in 1989. Conventional transmitter circuitry 101 accepts an "audio in" signal which undergoes typical filtering, compression, etc. Output from conventional transmitter circuitry 101 is a signal 102 which is input into wideband/narrowband average deviation adjust circuitry 103, in accordance with the invention. Also, input into circuitry 103 is mode select signal 106, which is used to toggle a transmission gate within circuitry 103 during operation. Mode select signal 106 is a signal used to indicate to transmitter 100 when transmitter 100 changes from a wideband mode to a narrowband mode of operation and vice versa. Mode select signal 106 may, for example, be an output from a microprocessor (or μprocessor, not shown) used to control transmitter 100. Output from circuitry 103 is a signal 104 which has voice deviation adjusted if mode select signal 106 indicates transmitter 100 is transmitting in the narrowband mode. Signal 104 is input into conventional limiter and filter circuitry 112 which provides peak deviation limiting and splatter filtering. Output from circuitry 112 is a signal 113 which enters wideband/narrowband maximum deviation adjust circuitry 115. Circuitry 115 adjusts for the difference in the maximum voice deviation from the wideband mode of operation to the narrowband mode of operation. Also, input into circuitry 115 is an inverted version 110 of mode select signal 106, inverted by inverter 109. Finally, output from circuitry 115 is transferred to a conventional analog modulator.

In the wideband mode, typical voice deviations may vary up to a maximum of 12 kHz, with an average voice deviation of 2.9 kHz. In the narrowband mode, typical voice deviations may vary up to a maximum 5 kHz, with an average voice deviation of 1.5 kHz. The goal of having a dual-mode transmitter 100 capable of automatic deviation adjustment between the wideband mode and the narrowband mode is to provide circuitry which adjusts the deviation levels based on a combination of the deviation levels, preferably taking into account the maximum deviation of each mode and the average deviation of each mode. In the preferred embodiment, the combination of deviation levels used is both the ratio of the maximum deviation level for each mode and a ratio of the average deviation level for each mode.

FIG. 2 generally depicts wideband/narrowband maximum deviation adjust circuitry 115 which adjusts for the difference in the maximum voice deviation from the wideband mode to the narrowband mode in accordance with the invention. In the preferred embodiment, resistor 200 has a resistance value of 27 KΩ, resistor 204 a value of 26.1 KΩ, and resistor 208 a resistance value of 17.8 KΩ. When voice deviation is at a maximum, the maximum deviations that can be transmitted by transmitter 100 are 12 kHz in the wideband mode, and 5 kHz in the narrowband mode. These deviations yield a wideband to narrowband maximum deviation ratio of 2.4:1. When operating in the wideband mode, transmission gate 206 which in the preferred embodiment is a MC 14066 manufactured by Motorola™, is "off", giving a feedback resistance of 26.1 KΩ. When mode select signal 106 is toggled, resulting in a toggling of signal 110, circuitry 115 operates in the narrowband mode. In the narrowband mode, transmission gate 206 is "on", giving a parallel combination of 10.76 KΩ (allowing 500 Ω for the transmission gate "on" resistance). This provides operational amplifier 202, which in the preferred embodiment is a MC 3303 manufactured by Motorola™, with gain compensation of 26.1/10.76=2.425 dB, therefore attenuating a signal having deviation of 12 kHz in the wideband mode down to a deviation of 5 kHz in the narrowband mode.

When voice deviations are not maximum, but are average, the respective average voice deviations for the wideband mode and the narrowband mode are 2.9 kHz and 1.5 kHz. These deviations yield a wideband to narrowband average deviation ratio of 1.933:1. In this scenario, if a signal with average deviation is to be transmitted, wideband/narrowband maximum deviation adjust circuitry 115 would provide too much attenuation. For example, when a signal having average deviation is transmitted, the signal is attenuated by 20 log (2.425/1.933)=1.97 dB more than it should be. Consequently, the circuitry depicted in FIG. 3, wideband/narrowband average deviation adjust circuitry 103, is used to provide the extra gain needed for a signal having average deviation level switched between the wideband mode and the narrowband mode. In the preferred embodiment, resistor 302 has a resistance value of 57.6 KΩ, resistor 308 a value of 162 KΩ, and resistor 310 a resistance value of 43.2 KΩ. Likewise, in the preferred embodiment, capacitor 300 has a capacitance of 0.22 μF and capacitor 304 has a value of 39 pF. Continuing, in the wideband mode, transmission gate 312, which is the same make and type as that of gate 206, is "on", giving a feedback resistance of 162 KΩ. When mode select signal 106 is toggled to indicate a change of mode, transmission gate 312 is "off", giving a total feedback resistance of 205.2 KΩ, or an extra gain of 20 log (205.2/162)=2.05 dB. Consequently, a signal transmitted in the wideband mode having an average deviation of 2.9 kHz will be amplified by circuitry 103, then attenuated by circuitry 115, to produce a signal having an average deviation of 1.5 kHz in the narrowband mode.

Thus, it will be apparent to one skilled in the art that there has been provided in accordance with the invention, an apparatus and method for automatic deviation level adjustment between wideband/narrowband mode change that fully satisfies the objects, aims and advantages set forth above. While the invention has been described in conjunction with a specific embodiment thereof, it is evident that many alterations, modifications, and variations will be apparent to those skilled in the art in light of the forgoing description. Accordingly, it is intended to embrace all such alterations, modifications, and variations in appended claims.

What we claim is:

1. A dual-mode transmitter for automatically adjusting a frequency deviation level of a signal to be transmitted, the transmitter comprising:

means for providing a signal indicating when the transmitter changes from a first mode to a second mode, wherein said first mode is a wideband mode and said second mode is a narrowband mode;

means for attenuating the frequency deviation level of the signal to be transmitted based on a change from said wideband mode to said narrowband mode; and means, coupled to said means for attenuating, for amplifying the frequency deviation level based on a change from said wideband mode to said narrowband mode.

2. A dual-mode transmitter for automatically adjusting a frequency deviation level of a signal to be transmitted, the transmitter comprising:

means for providing a signal indicating when the transmitter changes from a wideband mode to a narrowband mode, and vice versa;

means, coupled to said means for providing, for attenuating the frequency deviation level of the signal to be transmitted based on a ratio of a maximum frequency deviation level of said wideband mode to a maximum frequency deviation level of the narrowband mode when the transmitter changes from the wideband mode to the narrowband mode; and means, coupled to said means for indicating and said means for attenuating, for amplifying the frequency deviation level of the signal to be transmitted based on a ratio of an average frequency deviation level of said wideband mode to the average frequency deviation level of the narrowband mode when the transmitter changes from the wideband mode to the narrowband mode.

3. The transmitter of claim 2, wherein said frequency deviation levels comprise voice frequency deviation levels.

4. A method for automatically adjusting a frequency deviation level of a signal to be transmitted by a dual-mode transmitter, the method comprising:

providing a signal indicating when the transmitter changes from a wideband mode to a narrowband mode, and vice versa;

attenuating the frequency deviation level of the signal to be transmitted based on a ratio of a maximum frequency deviation level of said wideband mode to a maximum frequency deviation level of the narrowband mode when the transmitter changes from the wideband mode to the narrowband mode; and amplifying the frequency deviation level of the signal to be transmitted based on a ratio of an average frequency deviation level of said wideband mode to the average frequency deviation level of the narrowband mode when the transmitter changes from the wideband mode to the narrowband mode.

5. The dual-mode transmitter of claim 4, wherein said frequency deviation level further comprises a voice frequency deviation level.

* * * * *